United States Patent [19]
Lynn

[11] 3,805,536
[45] Apr. 23, 1974

[54] REMOVAL OF METHANE AND ARGON FROM AMMONIA SYNTHESIS GAS

[75] Inventor: Scott Lynn, Walnut Creek, Calif.
[73] Assignee: The Regents of the University of California, Berkeley, Calif.
[22] Filed: Dec. 16, 1970
[21] Appl. No.: 98,727

[52] U.S. Cl............................ 62/17, 62/22, 252/377, 55/70
[51] Int. Cl............ F25j 3/00, F25j 3/02, F25j 3/06
[58] Field of Search............... 62/17, 20, 22, 23, 24, 62/27, 28, 29; 23/93, 198–199; 55/70; 252/377; 423/359

[56] References Cited
UNITED STATES PATENTS

| | | | |
|---|---|---|---|
| 2,812,829 | 11/1957 | Marullo | 55/70 |
| 2,881,053 | 4/1959 | Bowers | 23/198 |
| 3,349,569 | 10/1967 | Nebgen | 62/17 |
| 1,690,585 | 11/1928 | Kniskern | 62/23 |
| 2,765,635 | 10/1956 | Redcay | 62/17 |
| 2,804,488 | 8/1957 | Cobb | 62/17 |
| 2,933,901 | 4/1960 | Davison | 62/17 |
| 3,287,262 | 11/1966 | Jones | 62/17 |

FOREIGN PATENTS OR APPLICATIONS

| | | | |
|---|---|---|---|
| 1,137,065 | 12/1968 | Great Britain | 23/199 |

Primary Examiner—Norman Yudkoff
Assistant Examiner—Arthur F. Purcell
Attorney, Agent, or Firm—Stanley Bialos; Donovan J. De Witt

[57] ABSTRACT

The content of inert gases, principally argon and methane, in the recycle gas stream to a reactor for synthesizing ammonia from hydrogen and nitrogen is maintained at the usual level without taking and venting a purge stream. Condensed ammonia from the reactor effluent stream, at temperatures of from about 25° to 100°C, is employed in an absorbing zone to absorb the gases in said stream, it having been found that the solubility thereof, which is in the order of methane>argon>nitrogen>hydrogen, becomes increasingly great as temperatures are increased within this range. Non-absorbed gases are recycled to the reactor. The ammonia condensate then flows from the absorbing zone to a stripping zone for counter-current contact with a strippant gas which is relatively rich in the more soluble methane and argon components and lean in the less soluble nitrogen and hydrogen, thereby desorbing a gas stream, for return to the absorbing zone, which is richer in the less soluble hydrogen and nitrogen reactant gases than the strippant gas, and leaner in the inert methane and argon gases. As the condensate from the stripping zone is then chilled, there is "distilled" therefrom the relatively methane-argon rich gas which serves the stripping function. As the condensate is thereafter flashed to storage pressures there is recovered a liquid ammonia product stream together with a product gas stream which is rich in methane and argon gases which can be separately recovered or vented. A portion of the ammonia product stream from the flashing step is normally recycled to the absorption zone.

7 Claims, 2 Drawing Figures

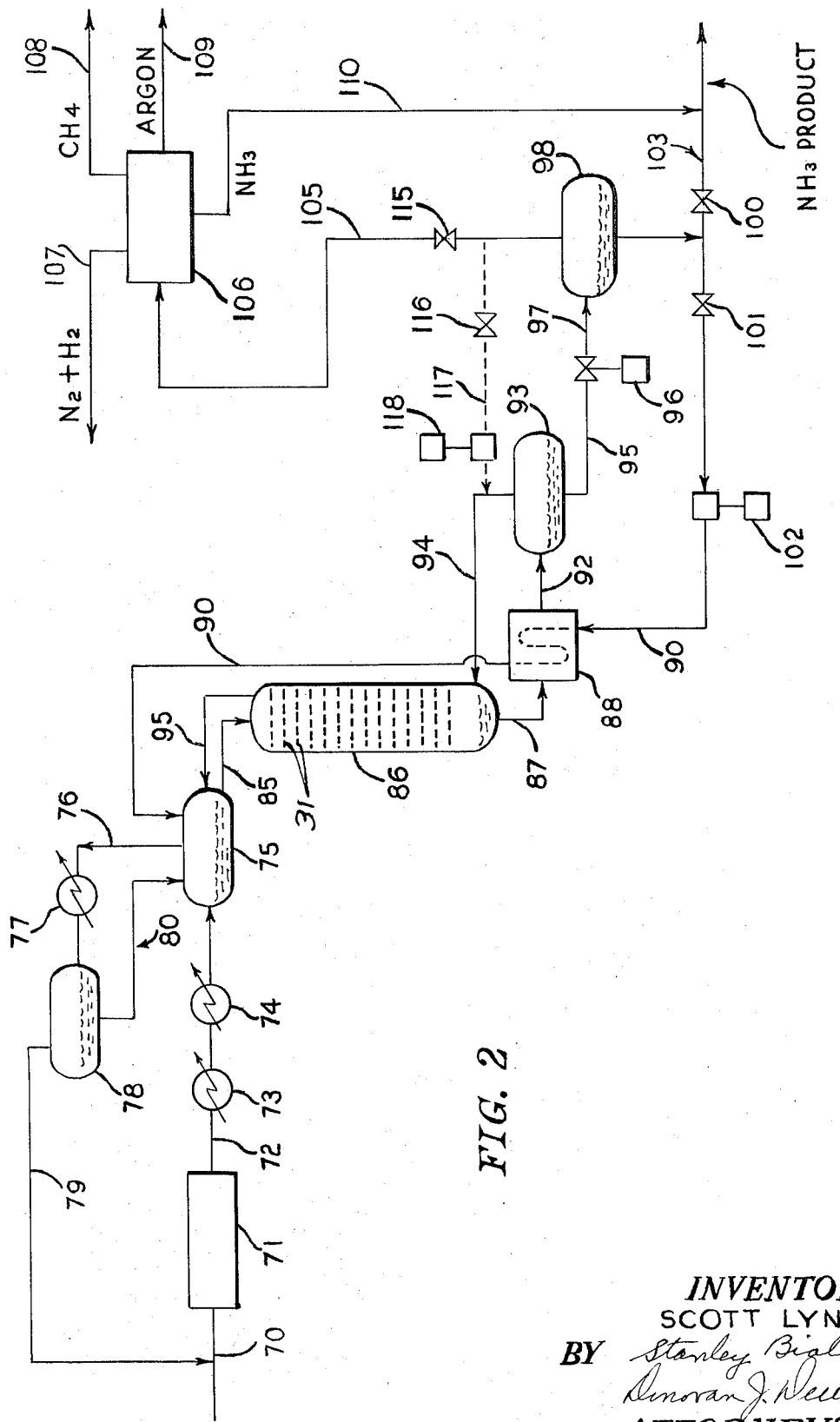

REMOVAL OF METHANE AND ARGON FROM AMMONIA SYNTHESIS GAS

BACKGROUND OF THE INVENTION

In the synthesis of ammonia as presently practiced, nitrogen and hydrogen in stoichiometric (1/3) proportions, are compressed to a pressure of 100 to 300 atmospheres, combined with recycle gas, and passed through a catalytic reactor. The ammonia formed in the reactor is removed from the effluent gases by cooling and the residual synthesis gas stream is then recycled to the reactor. Typically, about 20 percent of the hydrogen and nitrogen entering the reactor is converted to ammonia with each pass.

The fresh feed stream of nitrogen and hydrogen provided to the system generally contains about 0.7 percent or more methane and about 0.2 percent or more argon. These gaseous impurities, which are the principal ones present, are inert under the reaction conditions employed and if not removed they steadily build up in the recycle stream. They are conventionally removed from the system by taking a constant purge stream and venting it, thereby keeping the total content of argon and methane in the recycle stream at an acceptably low level of about 10 – 15 percent by volume. However, the loss of nitrogen and hydrogen incurred in this fashion is quite large, and in a modern plant may be of the order of 5 to 7 percent of the fresh feed. It is therefore an important object of this invention to provide a process wherein the concentration of methane and argon in the recycle stream is maintained at the aforesaid low level, while reducing nitrogen and hydrogen losses to insignificant proportions.

A further object of the invention is to provide a process for recovering a purge stream which is relatively rich in the valuable argon gas and from which this gas can be economically recovered by known cryogenic or other methods.

SUMMARY OF THE INVENTION

The present invention rests on the discovery that in the operation of an ammonia synthesis plant wherein a mixed nitrogen-hydrogen gaseous feed stream containing small amounts of methane and argon is passed at elevated temperatures and pressures over an appropriate catalyst in a reactor, with unreacted gases being recycled to the reactor, the impurity content of the recycle stream can be maintained at an acceptably low level of about 10 to 15 percent by volume without the practice of uneconomic methods whereby a portion of the recycle gases is constantly vented as a purge stream. Rather, in the present method the methane and argon tend to be separated from the gaseous effluent stream from the reactor by preferential absorption in a condensed product ammonia stream at relatively elevated temperatures between about 25° and 100°C. This is followed by a step whereby the resulting absorbate-containing condensate is stripped by a gas relatively rich in argon and methane which is effective to desorb a hydrogen-nitrogen enriched gas for ultimate return to the reactor as recycle along with similarly enriched gases in the aforesaid effluent stream which were not absorbed in warm ammonia condensate.

The solubility of the four recycle-gas components in liquid ammonia follows the order of $CH_4 > A > N_2 > H_2$, and it has been found that all four gases become increasingly soluble in the ammonia with an increase in temperature up to about 100°C. Accordingly, as the first step in the present process the effluent gases from the reactor are contacted, in whole or part, with ammonia condensate in an absorption zone at temperatures of from about 25° to 100° C which are high enough to dissolve the required amounts of methane and argon together, of course, with lesser amounts of the relatively more insoluble hydrogen and nitrogen. Effluent gases from the reactor which are brought into contact with the warm ammonia condensate but not absorbed therein are recycled to the reactor in the conventional fashion, said gases normally being refrigerated to condense out ammonia (which is returned to the absorption zone) before being heated and passed at elevated temperatures and pressures through the reactor along with fresh feed gases.

As the next step in the process, the absorbate-containing ammonia from the absorption zone then flows into a stripping zone which preferably takes the form of a unit similar to a tray-containing distillation column, in which the relatively less soluble nitrogen and hydrogen are preferentially stripped from the condensate by a strippant gas which is relatively rich in the more soluble argon and methane components and lean in the less soluble hydrogen and nitrogen, as compared with the composition of the gaseous effluent from the reactor.

The condensate from the stripping zone is then reduced in temperatures, thereby desorbing, or "distilling off," the methane-argon rich stream which is employed as the strippant gas.

The cooled ammonia condensate is then flashed down to storage pressure, thereby separating the liquid ammonia product from a product gas stream which contains ammonia vapors and is rich in argon and methane. This stream, after being scrubbed of its ammonia content, can be either vented or sent to a system for separating and recovering its various gaseous components. While the hydrogen-nitrogen content of the stream may be of the order of 20–40 percent, venting of this stream entails losses of hydrogen and nitrogen which are less than about 1 percent of the ammonia produced due to the relatively small total volume of this stream as compared with that of a conventional purge stream taken on recycle gases to the reactor.

These small hydrogen-nitrogen losses can be reduced still further, if desired, by recycling to the stripping zone at system pressures a portion of the effluent gases from the flashing step. Further, to provide a greater volume of ammonia absorbant in which to absorb effluent gases from the reactor, a portion of the ammonia recovered following the flashing step is normally recycled to the absorbing zone which can be either a liquid-vapor separating drum or a column provided with conventional plates, or trays, in which the liquid ammonia passes downwardly for contact with the rising gases to be absorbed.

DESCRIPTION OF THE PREFERRED EMBODIMENTS

Figure 1:
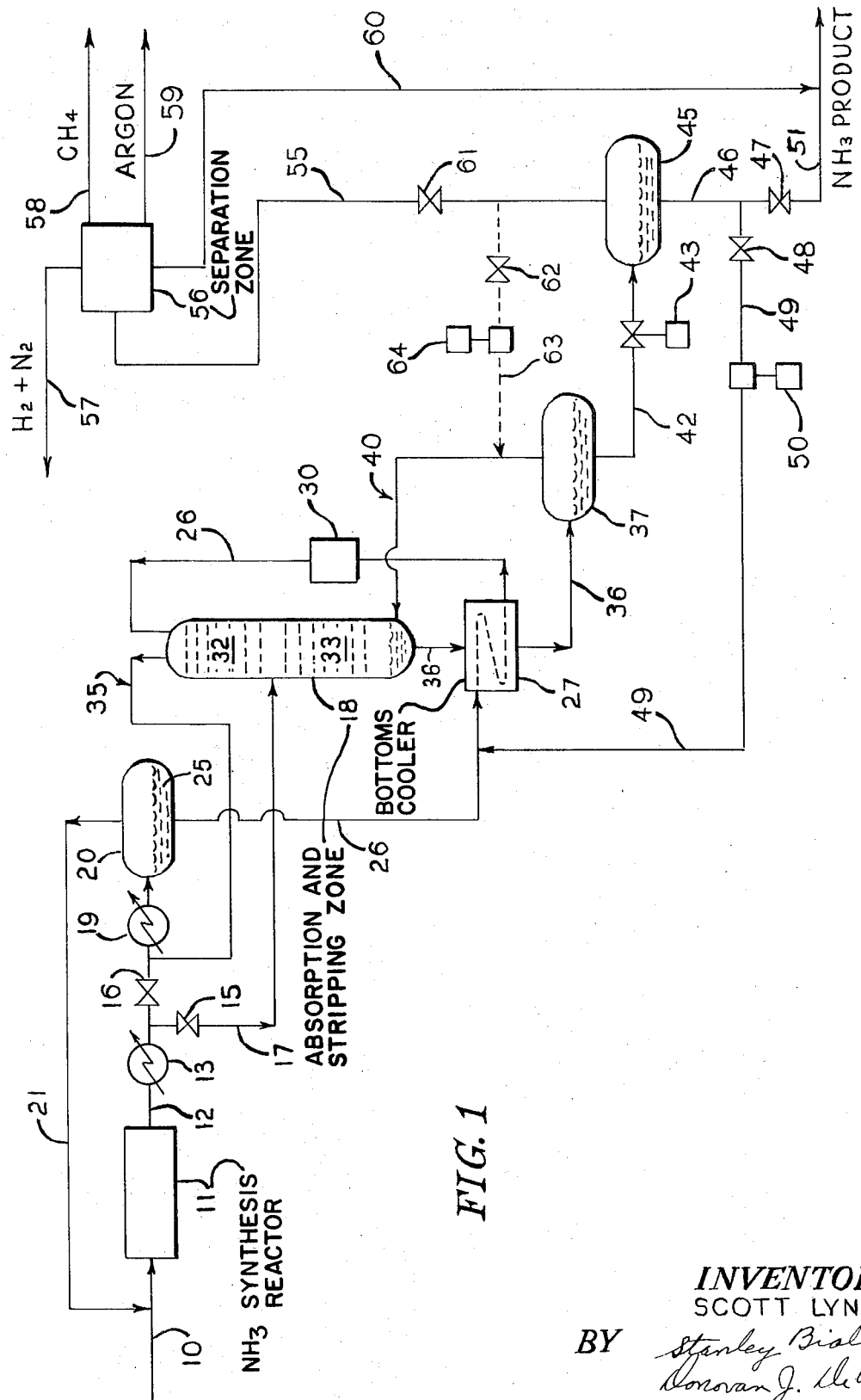

The invention can be clearly understood by reference to the appended drawings which present alternative flow schemes for an ammonia production facility utilizing the process of the present invention. In these drawings, which are generally schematic in nature, no attempt is made to indicate all of the various pumps, compressors, valves, instrumentation for pressure, temperature and liquid level control and the like, since the use and location of such equipment can readily be supplied by those skilled in the art in the light of the present teachings. the various pumps, compressors, valves Referring to these drawings:

FIG. 1 is a flow scheme, schematic in nature, of a plant for synthesizing ammonia illustrating an embodiment of this invention wherein but a portion of the effluent gases from the ammonia reactor is subjected to absorption within a column by a warm ammonia condensate formed from the entire reactor effluent, as supplemented by recycled product ammonia; and FIG. 2 is a flow scheme of a similar character illustrating the invention in another embodiment thereof wherein the entire effluent from the reactor, along with recycled product ammonia, is brought to moderately elevated temperatures and passed to a vapor-liquid absorption drum which acts as the absorption zone.

Referring now to FIG. 1, there is shown an operation wherein fresh feed gases consisting essentially of hydrogen and nitrogen, along with extremely small percentages of methane and argon (inert in the present reaction system) are passed through line 10 to a catalyst-containing reactor 11 at system pressures ranging from about 100 to 300 atmospheres, and at temperatures usually above 400°C. The effluent gases from the reactor are taken via line 12 through a suitable refrigeration zone indicated at 13 effective to reduce the temperature of the effluent stream to a level between about 25° and 100°C. As governed by the settings of valves 15 and 16, a portion of the gaseous effluent stream from the reactor is taken through line 17 for discharge into a midpoint of a column 18, while the balance of this effluent stream is passed through a second configuration zone 19 before being discharged into a vapor-liquid separating drum 20 which is maintained at temperatures of about −20° to 10°C. A recycle gas stream is taken overhead from drum 20 through line 21, while the condensate 25 therein is passed via line 26 through a heat exchanger 27 and a heater 30 which bring the condensate to the desired temperature between about 25° and 100°C as it is fed into the top of said column 18.

Column 18 is provided along its length with conventional plates or trays 31 which permit the ammonia condensate to pass downwardly from one tray to the next in contact with the rising gases as supplied to the column both through line 17 as well as through a line 40. The upper portion of this column (generally indicated at 32) acts as an absorption zone for the vapors discharged from line 17 as well as those which are stripped from the lower portion of the column (generally indicated at 33) which acts as the stripping zone and receives strippant gases through the aforesaid line 40. Those gases introduced into the column which are absorbed in zone 32 tend to be carried downwardly with the condensate into the stripping zone, while non-absorbed gases, made up essentially of hydrogen and nitrogen along with depleted amounts of argon and methane, as compared to the gases in line 17, are taken overhead through line 35 for ultimate return to the reactor as recycle after passing through refrigeration zone 19 and the separating drum 20 for separation of condensed ammonia.

The condensate from the stripping zone is removed from the bottom of column 18 through line 36. It is appreciably cooled by passage through heat exchanger 27, and when discharged into a vapor-liquid separating drum 37 is at a temperature (e.g., about −20° to 10°C) which is well below the temperatures prevailing in column 18. This cooling of the condensate is akin to distillation, for it acts to desorb a considerable portion of the gases which were absorbed at the higher temperatures. These desorbed gases, which are relatively rich in methane and argon and lean in hydrogen and nitrogen, are taken overhead from drum 37 through line 40 connected to stripping zone 33 and, as stated above, act as the strippant stream which tends to displace the less soluble hydrogen and nitrogen gases present in the liquid passing from the absorption zone into the stripping zone and thus force them towards the top of column 18 through absorption zone 32. Much of the argon and methane in strippant line 40 is reabsorbed in zone 32 of the column and is thus kept out of the recycle to the reactor in line 35.

The ammonia condensate in drum 37 is passed via line 42 through a pressure reducing valve 43 which brings the liquid to storage pressures, this reduction in pressure also acting to further cool the liquid ammonia and thus desorb essentially all of the gases present therein as the product reaches the vapor-liquid separating drum 45. From this drum a product ammonia stream is withdrawn through lines 46 and 51, with a portion thereof, as governed by the settings of valves 47 and 48, being returned as recycle to the top of column 18 through line 49 and pump 50, via line 26, heat exchanger 27 and heater 30.

The gaseous product stream from separator 45 is taken overhead through line 55 for processing in a zone indicated at 56 which operates in conventional fashion to condense product ammonia, taken through line 60, and, if desired, to separate the residual gases by conventional cryogenic or other methods into hydrogen and nitrogen, line 57, and methane and argon recovered through lines 58 and 59, respectively.

Should it be desired to increase the quantity of the stripping gas supplied to column 18 and thus reduce further the amount of hydrogen and nitrogen in line 55, a portion of the gases in said line, as determined by the setting of valves 61 and 62, can be diverted through line 63 and compressor 64 for discharge into line 40.

In exemplary methods of operating the unit shown in FIG. 1, approximately 10 to 30 percent of the effluent gases from the reactor can be discharged through line 17 into the combined absorption-stripping column 18. Further, of the product ammonia taken through line 46 from drum 45, approximately 25 to 75 percent can be returned as recycle through line 49, with the balance sent to storage in line 51, supplemented by additional condensate from line 60.

Referring to FIG. 2 of the drawings, there is shown a processing sequence wherein the fresh hydrogen-nitrogen feed is passed through line 70 into the reactor 71 for exit via line 72 through refrigeration units 73 and 74 for discharge into the vapor-liquid separating drum 75. The temperature in this drum, which acts as the absorption zone, is from about 25° to 100°C, thereby assuring a high degree of absorption. Non-absorbed gases are taken overhead through line 76 and are passed through refrigeration zone 77 which condenses much of the ammonia present in the gas stream. On being discharged into the vapor-liquid separating drum 78, the non-condensed vapors pass back to the reactor as recycle through lines 79 and 70, while the ammonia condensate is returned to drum 75. As discussed below, a recycle ammonia condensate stream, substantially free of absorbed gases, is also discharged into drum 75 from line 90, thereby increasing the absorption capacity of this absorption zone of the unit.

The absorbate-containing ammonia condensate from drum 75 is passed through line 85 for discharge into the top of a stripping column 86 provided along its length with conventional communicating plates, or trays 31. Liquid flowing downwardly through the column is preferentially stripped of its relatively less soluble nitrogen and hydrogen components as the liquid contacts the upflowing strippant gas (relatively rich in argon and methane and lean in hydrogen and nitrogen as compared with the effluent in line 72) which is supplied at the bottom of the column through line 94. The condensate is removed from the stripping zone at the bottom of column 86 through line 87 and is cooled on passage through heat exchange unit 88 by the cold, product ammonia recycle stream in line 90 which, on being warmed by passage through said heat exchanger, is discharged into the separating drum 75.

The cooled ammonia condensate is discharged via line 92 into the vapor-liquid separating drum 93 from which, at the lower temperatures now prevailing, gases are desorbed from the condensate. This gas, which is relatively rich in methane and argon and lean in hydrogen and nitrogen, constitutes the strippant gas which is passed into column 86 through line 94. Gases emerging overhead from this column are returned through line 95 to drum 75 from which they enter the recycle stream to the reactor through line 76.

The workup of the ammonia condensate from drum 93 is essentially the same as that described above in connection with FIG. 1. Thus, the condensate in line 95, on passing through pressure reducing valve 96, is flashed in a vapor-liquid separating drum 98 from which the liquid ammonia product stream is taken through lines 99 and 103. Depending on the setting of valves 100 and 101, the desired portion of the condensate may be recycled back to drum 75 through line 90, this recycle stream being brought to system pressures by passage through a pump 102. Gases flashed from the ammonia are taken overhead through line 105 for appropriate separation, in a zone generally indicated at 106, into respective nitrogen and hyrogen, methane, argon and condensed ammonia streams as indicated at 107, 108, 109 and 110, respectively.

If an increased amount of strippant gas is required, valves 115 and 116 can be set so as to recycle to the stripping zone 86 a portion of the gases in line 105. This can be accomplished by the proper setting of valves 115 and 116, thereby diverting gas through line 117 and compressor 118 to line 94.

EXAMPLE 1

An example of an ammonia plant operating at a nominal pressure of 200 atmospheres and employing this invention is given below in Table I which lists the compositions and flows obtaining at various points on the flow diagram of FIG. 1. Compositions are given in mole fractions, and flows are given as moles per mole of ammonia product.

The fresh feed (line 10) is seen to contain only slightly more than 1 percent of the inert gases argon and methane. As in conventional plant operation, the level of the inerts is allowed to rise to between 10 and 15 percent in the recycle gas (line 21), the exact value being determined on a day-to-day basis to optimize plant performance.

A side-stream (line 17) is taken from the converter effluent (line 12) after it has been partially cooled and is introduced as the gaseous feed to column 18, which is operated at 100°C. In the absorber (upper) section of the column the gas moves counter-currently to the liquid ammonia absorbant, which is introduced at the top of the column (line 26) substantially free of dissolved gases. In the stripper (lower) section of the column, the absorbant liquid is stripped of a substantial part of its dissolved hydrogen and nitrogen as it moves counter-currently to the strippant gas, which is introduced at the bottom of the column (line 40). The liquid leaving the bottom of the column is chilled by counter-current heat exchange with the liquid feed to the column and then enters a vapor-liquid separator 37. The gases driven out of solution by the chilling of the liquid are sent back to the column as the strippant gas (line 40) and the liquid (line 42) is flashed to near atmospheric pressure and sent to a second vapor-liquid separator 45.

The gas leaving this separator (line 55) is rich in argon and methane and contains only a small fraction of the hydrogen and nitrogen which would be lost in the purge from a conventional plant. Half of the liquid leaving the separator is the plant product (line 51) and half is recycled to the column (line 49).

The gas leaving the column (line 35) is returned to the recycle stream in line 12 ahead of the condensor. The liquid ammonia in line 26, formed when the recycle stream passes through the condensors, forms part of the feed to the column. Its content of methane and argon is negligibly small because of the low temperature at which it is formed and because of the relatively low concentrations of the inert gases in the stream with which it is in equilibrium.

The foregoing example is but one embodiment of the subject invention, and while it illustrates one manner in which the invention may be employed, it is not to be in- TABLE.—APPROXIMATE COMPOSITIONS AND FLOWS FOR COLUMN OPERATION AT 100°C, 200 ATM; "REBOILER" AT −20°C, 200 ATM; NO VAPOR RECOMPRESSION

| | Figure 1, stream line No. | | | | | | | | | | | | |
|---|---|---|---|---|---|---|---|---|---|---|---|---|---|
| | 10 | 10 and 21 | 21 | 12 | 26 | 55 | 51 | 35 | 17 | 26 | 40 | 42 | 49 |
| Mole fraction: | | | | | | | | | | | | | |
| $NH_3$ | | *AFB | AFB | 0.0975 | 1.00 | AFB | 1.00 | 0.590 | 0.0975 | 1.00 | 0.027 | 0.987 | 1.00 |
| $N_2$ | 0.248 | 0.222 | 0.216 | .195 | | 0.238 | | .089 | .195 | | .435 | .0031 | |
| $H_2$ | .742 | .666 | .650 | .585 | | | | .288 | .585 | | .215 | .0030 | |
| A | .0030 | .067 | .075 | .068 | | .220 | | .026 | .068 | | .215 | .0030 | |
| $CH_4$ | .0074 | .055 | .060 | .054 | | .552 | | .009 | .054 | | .323 | .0075 | |
| Stream flows mols/mol product | 2.02 | 11.27 | 9.25 | 10.27 | 1.44 | .027 | 1.00 | .81 | .40 | 2.44 | .10 | 2.01 | 1.0 |

*AFB = Ammonia free basis.

terpreted in a limiting sense. Thus, in another embodiment of the invention, the pressure in line 42 can be reduced in stages so as to recover a desorbed gas, lean in hydrogen and nitrogen, which can then be recycled to the stripping zone 33 with little additional pressurization. The final gaseous product stream (line 55) is then recovered after a subsequent depressurization step. Still other modifications will suggest themselves to those skilled in the art.

I claim:

1. In a continuous process for the synthesis of ammonia wherein synthesis gases containing nitrogen and hydrogen, along with small amounts of methane and argon impurities, are continuously passed at elevated temperatures and pressures over a catalyst in a reactor to form a gaseous effluent stream from which product ammonia is condensed, with unreacted gases being recycled to the reactor, the improved method of operation whereby the content of methane and argon in the gases recycled to the reactor is maintained at an acceptably low level and ammonia yield increased by the continuous practice of the steps of,
  a. providing a column having an upper absorption zone and a lower stripping zone;
  b. forming an ammonia condensate from said gaseous effluent stream and passing said condensate, at temperatures of from about 25° to 100° C, into said absorption zone for contact with the gases in at least a portion of the said stream while recycling to the reactor those gases from the effluent stream which are not absorbed in such ammonia condensate;
  c. passing the ammonia condensate from the absorption zone, at the aforesaid temperatures, through said stripping zone in counter-current flow with a strippant gas which is relatively rich in the more soluble methane and argon gases and lean in the less soluble hydrogen and nitrogen gases, as compared with the said gaseous effluent stream, to desorb from the consensate a gas which is relatively rich in hydrogen and nitrogen and lean in methane and argon, as compared with the strippant gas;
  d. passing the desorbed, hydrogen-nitrogen rich gas from said stripping zone into said absorption zone;
  e. chilling the ammonia condensate from the stripping zone and passing it into a separating drum to desorb therefrom a gas which comprises the said strippant gas and is passed from said separating drum to the stripping zone, as aforesaid; and
  f. flashing the resulting ammonia condensate, at reduced pressures, to separate from a residual liquid ammonia product a product gas which is richer in methane and argon and leaner in nitrogen and hydrogen than the aforesaid strippant gas.

2. In a continuous process for the synthesis of ammonia wherein synthesis gases containing nitrogen and hydrogen, along with small amounts of methane and argon impurities, are continuously passed at elevated temperatures and pressures over a catalyst in a reactor to form a gaseous effluent stream from which product ammonia is condensed, with unreacted gases being recycled to the reactor, the improved method of operation whereby the content of methane and argon in the gases recycled to the reactor is maintained at an acceptably low level and ammonia yield increased by the continuous practice of the steps of,
  a. forming an ammonia condensate from said gaseous effluent stream and passing said condensate, at temperatures of from about 25° to 100° C, through an absorption zone for contact with the gases in at least a portion of the said stream while recycling to the reactor those gases from the effluent stream which are not absorbed in ammonia condensate;
  b. passing the ammonia condensate from the absorption zone, at the aforesaid temperatures, through a stripping zone in counter-current flow with a strippant gas which is relatively rich in the more soluble methane and argon gases and lean in the less soluble hydrogen and nitrogen gases, as compared with the said gaseous effluent stream, to desorb from the condensate a gas which is relatively rich in hydrogen and nitrogen and lean in methane and argon, as compared with the strippant gas;
  c. passing the desorbed, hydrogen-nitrogen rich gas to the absorption zone;
  d. chilling the ammonia condensate from the stripping zone to desorb therefrom a gas which comprises the said strippant gas and is passed to the stripping zone, as aforesaid; and
  e. flashing the resulting ammonia condensate, at reduced pressures, to separate from a residual liquid ammonia product a product gas which is richer in methane and argon and leaner in nitrogen and hydrogen than the aforesaid strippant gas.

3. The process as recited in claim 2 wherein a portion of the liquid ammonia product recited in step (e) is continuously recycled to the absorption zone and wherein gases admitted to the absorption zone and not absorbed therein are refrigerated and passed to a vapor-liquid separating drum from which uncondensed gases are taken overhead for return as recycle to the reactor, while the liquid condensate from the drum is passed into the absorption zone.

4. The process as recited in claim 3 wherein a portion of the product gas recited in step (e) is continuously recycled as strippant gas to the stripping zone.

5. The process as recited in claim 3 wherein the entire gaseous effluent stream from the reactor is continuously cooled to temperatures of from about 25° to 100° C and passed into the absorption zone which comprises a liquid-vapor separating drum.

6. The process as recited in claim 3 wherein a portion of the gaseous effluent system from the reactor is continuously refrigerated and passed to a vapor-liquid separating drum from which the vapors are taken overhead for return to the reactor, while the liquid condensate is removed from the drum, warmed to temperatures of from about 25° to 100° C and passed into the absorption zone, and wherein the balance of the gaseous effluent stream is passed to the absorption zone for contact therein with the warmed condensate.

7. The process of claim 6 wherein the warmed ammonia condensate is continuously passed into the top of a column provided along its length with communicating vapor-liquid contacting trays, wherein the said balance of the gaseous effluent stream is continuously passed into a midpoint of said column for absorptive contact with the descending condensate in an absorption zone comprising the portion of the column above said midpoint, and wherein the portion of the column below said midpoint acts as the stripping zone into the bottom of which the strippant gas is introduced and from the top of which hydrogen-nitrogen enriched gases continuously emerge for passage into the overlying absorption zone.

* * * * *